US012773817B2

(12) United States Patent
Cazeaux et al.

(10) Patent No.: US 12,773,817 B2
(45) Date of Patent: Oct. 27, 2026

(54) METHOD FOR MANUFACTURING AN INTERMEDIATE RESISTIVE MEMBRANE OF AN ACOUSTIC LINER

(71) Applicant: Airbus Operations SAS, Toulouse (FR)

(72) Inventors: Laurent Cazeaux, Toulouse (FR); Laurent Caliman, Toulouse (FR); Nicolas Charton, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/897,611

(22) Filed: Sep. 26, 2024

(65) Prior Publication Data

US 2025/0108544 A1 Apr. 3, 2025

(30) Foreign Application Priority Data

Sep. 28, 2023 (FR) .................................. FR2310364

(51) Int. Cl.

| | |
|---|---|
| ***B29C 45/14*** | (2006.01) |
| ***B29C 45/00*** | (2006.01) |
| ***B29C 45/27*** | (2006.01) |
| *B29K 105/06* | (2006.01) |
| *B29K 701/12* | (2006.01) |
| *B29L 7/00* | (2006.01) |

(52) U.S. Cl.

CPC .... *B29C 45/14008* (2013.01); *B29C 45/0055* (2013.01); *B29C 45/27* (2013.01); *B29K 2105/06* (2013.01); *B29K 2701/12* (2013.01); *B29K 2995/0002* (2013.01); *B29L 2007/002* (2013.01)

(58) Field of Classification Search

CPC ... B29C 45/14008; B29C 45/14; B29C 45/00; B29C 45/0053; B29C 45/26; B29C 45/2632; B29C 45/36; B29C 2043/563; B29C 2033/426; B29C 33/424; B29C 2033/422

See application file for complete search history.

(56) References Cited

U.S. PATENT DOCUMENTS

| | | | | |
|---|---|---|---|---|
| 2015/0027629 | A1 | 1/2015 | Butler et al. | |
| 2020/0265821 | A1* | 8/2020 | Riccobene | B29C 39/026 |
| 2020/0342843 | A1* | 10/2020 | Brossard | B29D 99/001 |
| 2025/0001653 | A1* | 1/2025 | Alglave | B29C 43/021 |

FOREIGN PATENT DOCUMENTS

| | | | |
|---|---|---|---|
| FR | 3125245 | A1 | 1/2023 |
| WO | 2023017222 | A1 | 2/2023 |
| WO | 2023089267 | A1 | 5/2023 |

OTHER PUBLICATIONS

French Search Report and Written Opinion for corresponding French Patent Application No. 2310364 dated May 2, 2024.

* cited by examiner

*Primary Examiner* — Cedrick S Williams

(74) *Attorney, Agent, or Firm* — Greer, Burns & Crain, Ltd.

(57) ABSTRACT

A method for manufacturing an intermediate resistive membrane, called a "septum", with tubular guides for a DDOF (double degree of freedom) acoustic treatment panel. The method includes the membrane and the tubular guides being manufactured by the same operation of injecting a resin around a substrate placed between two parts of an injection mold.

8 Claims, 2 Drawing Sheets

METHOD FOR MANUFACTURING AN INTERMEDIATE RESISTIVE MEMBRANE OF AN ACOUSTIC LINER

CROSS-REFERENCES TO RELATED APPLICATIONS

This application claims the benefit of French Patent Application Number 2310364 filed on Sep. 28, 2023, the entire disclosure of which is incorporated herein by way of reference.

FIELD OF THE INVENTION

The invention relates to a method for manufacturing an intermediate resistive membrane, called a "septum", of what is known as an acoustic panel with a double degree of freedom. More particularly, the invention relates to a method for manufacturing a membrane of the septum type, comprising a plurality of integrated tubular guides for manufacturing an acoustic panel for aircraft.

BACKGROUND OF THE INVENTION

Acoustic panels (or liners) of the double degree of freedom (DDOF) type are known. These acoustic panels make use of acoustic treatments designed to reduce an incident sound wave directed towards a face of such a panel. These acoustic panels comprise two cellular cores or layers (usually of the honeycomb type), superimposed, and separated by an intermediate resistive layer called a "septum", which intermediate layer comprises openings and comprises many tubular guides, each of which is commonly associated with a pair of honeycomb cells belonging, respectively, to one or other of the two cellular cores. The honeycomb cells of one such pair are arranged facing one another, but are not necessarily completely centered with respect to one another, and a plurality of tubular guides may be implemented for such a pair of honeycomb cells. Such DDOF acoustic panels are notably, but not exclusively, used in the walls of aircraft nacelles or in turbojet housings. Numerous elements are assembled for the manufacture of a DDOF acoustic panel or liner, including the intermediate resistive membrane, comprising openings, and the tubular guides (tubes) assembled in or around these openings. Usually, depending on the desired characteristics, the intermediate membrane or "septum" is made of glass or carbon, thus facilitating the tube fitting because of the transparency of the glass, if present, and tubular guides of polymer material are robotically assembled on or into said septum and sealed, the manufacture of the assembly thus being complex, difficult and costly.

The situation can be improved.

SUMMARY OF THE INVENTION

One object of the present invention is to improve the conditions of the manufacture of an intermediate resistive membrane of an acoustic panel by decreasing the number of steps required, in order to simplify and accelerate the manufacturing process and reduce the cost thereof.

To this end, a method for manufacturing an intermediate resistive membrane with tubular guides for an acoustic panel is proposed, the method being such that said membrane and said tubular guides are manufactured in the same operation of injecting a resin around a substrate placed between two parts of an injection mold, the mold being configured so that one of the two parts of the mold comprises a plurality of protuberances, each having a surface of complementary shape to a shape of an inner surface of said tubular guides, the other of said two parts of the mold comprising a plurality of cavities, each having a surface of a shape complementary to a shape of an outer surface of said tubular guides, the substrate comprising perforations, and said method comprising the insertion of each of said protuberances into one of said perforations of said substrate before or during the closure of the mold and before said injection operation.

Advantageously, the manufacture of a resistive membrane, or "septum", for an acoustic treatment panel or liner is made simpler and more reliable, and its cost is reduced.

The method for manufacturing an intermediate resistive membrane with tubular guides for an acoustic panel according to the invention may also comprise the following characteristics, considered in isolation or in combination:

- The substrate used according to the method is made of thermoplastic composite material of the dry fiber type.
- The substrate used comprises short fibers, long fibers or continuous fibers.
- The perforations of the substrate used according to the method are formed by a stamping operation.
- The stamping operation comprised in the method is executed in a heated stamping press.
- The injection mold used according to the method comprises a plurality of injection channels dedicated to the manufacture of each of said tubular guides.

BRIEF DESCRIPTION OF THE DRAWINGS

The abovementioned characteristics of the invention, along with others, will become more clearly apparent on reading the following description of an example of embodiment, said description being given with reference to the appended drawings.

DETAILED DESCRIPTION OF THE PREFERRED EMBODIMENTS

Figure 1:
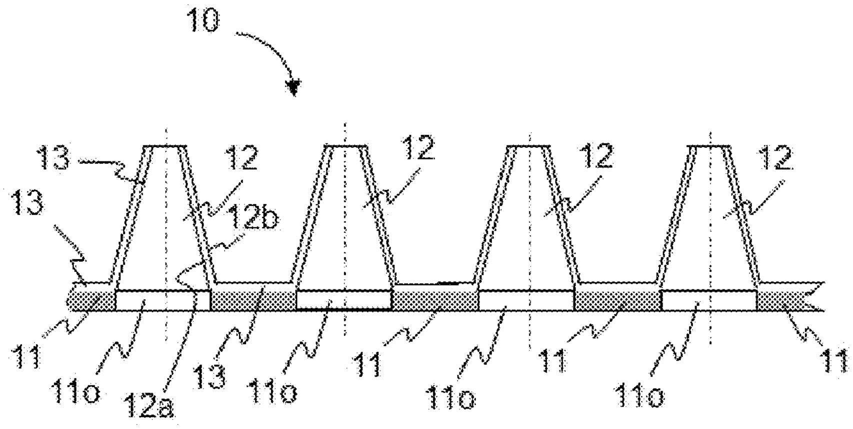
FIG. 1 shows an intermediate resistive membrane of the septum type of a DDOF acoustic panel manufactured according to a first embodiment.

FIG. 1 shows schematically and symbolically an intermediate resistive membrane 10, called a "septum", arranged so as to separate two cellular cores of the same acoustic panel with a double degree of freedom, according to a first embodiment. Here, the term "panel" may equally well denote either an acoustic panel or an acoustic liner. The intermediate resistive membrane 10 comprises a substrate, or reinforcer, 11 which is pre-perforated (that is to say, perforated before being positioned in the injection mold), called a "consolidated" substrate, embedded in a resin 13. Thus, the substrate 11 comprises a plurality of calibrated openings, or perforations, 11*o*. The body of the intermediate resistive membrane 10 is therefore primarily composed of the resin 13 and the perforated substrate 11. According to this embodiment of the invention, the substrate is a sheet of rigid polymerized thermoplastic material, and the resin is a thermoplastic resin of the PEKK type, possibly containing short fibers. However, these examples are not limiting, and variants may be chosen. For example, a resin of the PEEK, LM PAEK or PI type may be used, depending on the target thickness of the septum, the environment of use, and the temperatures of use. The characteristics of these resins are not detailed here, since those skilled in the art will be capable of choosing a resin for use according to the desired final characteristics. Advantageously, the resistive membrane 10 comprises a plurality of tubular guides 12, each of which is designed to act as the neck of a Helmholtz resonator after the assembly of a DDOF panel or liner. In other words, the tubular guides 12 are necks of Helmholtz resonators. According to a non-limiting embodiment of the invention, the shape of each of the tubular guides 12 is trunco-conical or substantially trunco-conical. Perforations 110 of the substrate are positioned facing tubular guides 12, so that the tubular guides 12, acting as Helmholtz resonator necks, are assembled facing a first cell of a first cellular core of an acoustic panel on the one hand, and facing a second cell of a second cellular core of the same acoustic panel on the other hand. Each of the tubular guides 12 has an outer surface 12*b* and an inner surface 12*a*, formed by injecting resin 13 into an injection mold 100 (shown in FIG. 3). More generally, the whole of the resistive membrane 10 is formed in the same single operation of injecting resin into an injection mold comprising the perforated substrate 11 of the consolidated type.

Figure 2:
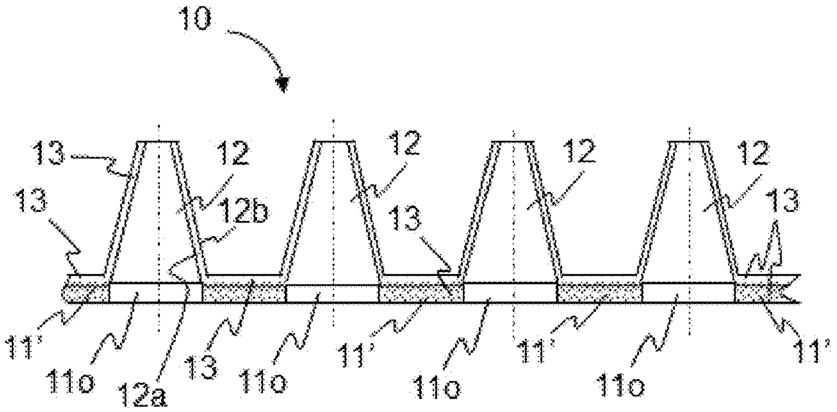
FIG. 2 shows an intermediate resistive membrane of the septum type of a DDOF acoustic panel manufactured according to a second embodiment.

FIG. 2 shows schematically and symbolically an intermediate resistive membrane 10, called a "septum", arranged so as to separate two cellular cores of the same acoustic panel with a double degree of freedom, according to a second embodiment. Here again, the term "panel" denotes either an acoustic panel or an acoustic liner. The intermediate resistive membrane 10 comprises a substrate 11' (or reinforcer 11'), perforated by the protuberances 102*a* of the injection mold 100 during the closure of the injection mold 100, and then impregnated with and embedded in a resin 13. The substrate 11' is formed as a mesh of short, long or continuous fibers, or from a combination of two or more types of these fibers. The characteristics of these fibers are not detailed here, since those skilled in the art will be capable of choosing the fibers for use according to the desired final characteristics.

The body of the intermediate resistive membrane 10 is therefore primarily composed of the substrate 11' impregnated with the resin 13, on which the resin 13 is laid. Advantageously, the resistive membrane 10 again comprises a plurality of tubular guides 12, each of which is designed to act as the neck of a Helmholtz resonator after the assembly of a DDOF panel or liner. In other words, the tubular guides 12 are necks of Helmholtz resonators. According to a non-limiting embodiment of the invention, the shape of each of the tubular guides 12 is trunco-conical or substantially trunco-conical. Here again, perforations 11*o* of the substrate, formed by inserting the protuberances 102*a* into the substrate 11', are positioned facing tubular guides 12, so that the tubular guides 12, acting as Helmholtz resonator necks, are assembled facing a first cell of a first cellular core of an acoustic panel on the one hand, and facing a second cell of a second cellular core of the same acoustic panel on the other hand. As in the first embodiment, each of the tubular guides 12 has an outer surface 12*b* and an inner surface 12*a*, formed by injecting resin 13 into the injection mold 100 (shown in FIG. 3). More generally, the whole of the resistive membrane 10 is formed in the same single operation of injecting resin into an injection mold comprising the substrate 11' consisting of a fiber mesh.

Figure 3:
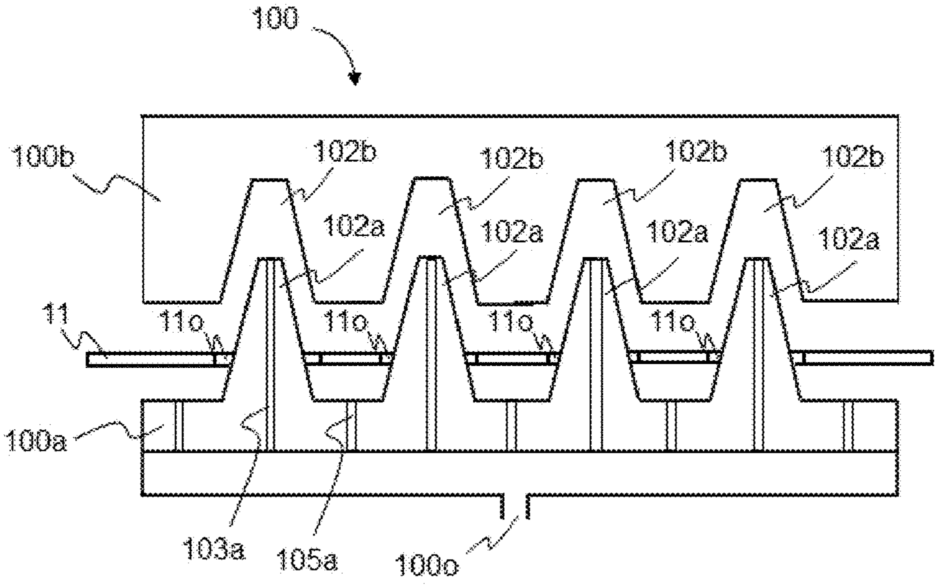
FIG. 3 shows schematically a substrate of material positioned in an injection mold before manufacturing by resin injection according to one embodiment.

FIG. 3 shows schematically an injection mold 100 configured for executing operations of injecting resin from an opening 100*o* and from a plurality of injection channels 103*a* and 105*a*. The injection mold 100 is configured for operations of injecting the resin 13. According to an example of embodiment, the injection mold 100 comprises an upper part 100*b* and a lower part 100*a*. The upper part 100*b* of the injection mold 100 comprises a plurality of cavities 102*b*, and the lower part 100*a* of the injection mold 100 comprises a plurality of protuberances 102*a*. According to the example of embodiment described, each pair of injection channels 103*a* and 105*a* is used for forming a tubular guide 12 in the injection mold 100 by resin injection. The injection mold 100 is therefore arranged so that, in an operation of injecting the resin 13, and after the closure of the injection mold 100, the resin injected into residual spaces, each defined between a protuberance 102*a* and a cavity 102*b*, creates the plurality of tubular guides 12 around the perforated substrate 11 or 11', which has previously been inserted into the injection mold 100. The structure of the injection mold 100 is such that, in order to position the substrate 11 or before the closure of the injection mold 100, the substrate is introduced into it so that each of the protuberances 102 is inserted into one of the perforations 11*o* in the substrate 11. The injection mold 100 is closed by bringing the lower part 100*a* and the upper part 100*b* together. If the substrate is the substrate 11' of the fiber mesh type, it is perforated by the protuberances 102*a* during the closure of the injection mold 100.

Figure 4:
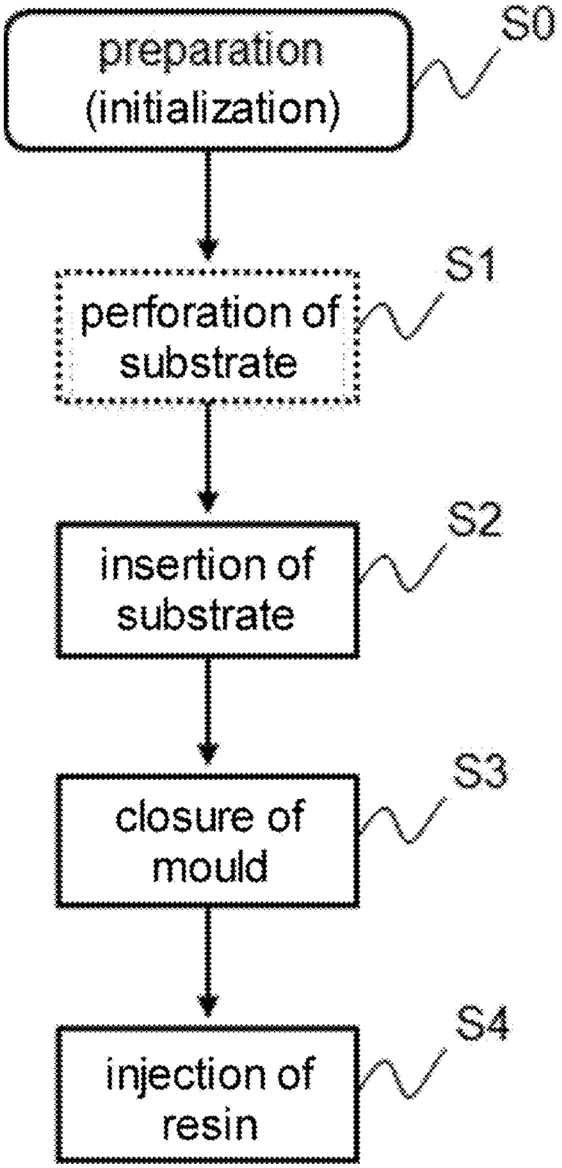
FIG. 4 shows steps of the method for manufacturing an intermediate resistive membrane as shown in FIG. 1.

FIG. 4 is a diagram showing a method for manufacturing the intermediate resistive membrane 10 according to one embodiment.

An initial step S0 is a step of preparation for the method, also called an initialization step, on completion of which all the hardware and/or human resources are available for the execution of the method for manufacturing the resistive membrane 10.

An optional step S1 of perforating the substrate plate is initially executed to provide the perforations 11*o* in the substrate 11 when the latter is what is called a consolidated substrate, that is to say, for example, a sheet of rigid polymerized thermoplastic material such as that used according to the first embodiment described with reference to FIG. 1. According to one embodiment, the perforations 11*o* are then formed by stamping, using a stamping tool (a press). According to a particular, non-limiting embodiment, the stamping operation is carried out in a heated stamping press whose temperature is between 330° C. and 400° C. for a PEKK resin, depending on the tools used. By means of such stamping, using a heated stamping press, the perforated substrate 11 can be pre-formed before its insertion into the injection mold 100, followed by the closure of the mold 100 and the injection of the resin 13. After the substrate 11 has been perforated to provide the perforations 1*o*, a step S2 of inserting the substrate into the injection mold 100 is executed. If the substrate takes the form of a dry fiber mesh, for example according to the second embodiment described with reference to FIG. 2, according to which the substrate is the substrate 11', the optional step S1 is omitted and the substrate 11' is inserted into the injection mold 100 in step S2 immediately after the initial step S0 of preparation for the method. In step S2, the substrate is placed on the lower part 100*a* of the injection mold 100, the protuberances 102*a* being positioned in the perforations 11*o* if the substrate is pre-perforated. The parts 100*a* and 100*b* of the mold are then brought together in a step S3 until the residual space between the lower part 100*a* and upper part 100*b* determines the thickness and shape of the resistive membrane 10 which will be obtained after injection. If the substrate is not pre-perforated, that is to say if it takes the form of a dry fiber mesh, the protuberances 102*a* are inserted through the mesh of the substrate and pass through it when the lower part 100*a* and upper part 100*b* of the injection mold 100 are brought together.

Finally, the resin 13 is injected in a step S4 in which the resin 13 is inserted under pressure via the opening 100*o* of the injection mold 100, and expands into the whole of the residual space via the plurality of injection channels 103*a* and the plurality of injection channels 105*a*. The injection operation is carried out in the injection mold 100, which is heated to a temperature of between 330° C. and 400° C. in order to obtain the desired degree of viscosity of the resin, a PEKK resin for example, for the injection. The mold temperature is adjusted according to the type of resin used and the desired viscosity, and may therefore vary according to the type of resin and the degree of viscosity expected. After demolding, a final step of cropping the tubular guides 12 is executed, to form openings at their tops, at the position where the injection channels 103*a* open. This final step is executed, for example, by shearing or by mechanical abrasion.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

Claimed is:

1. A method for manufacturing an intermediate resistive membrane with tubular guides for an acoustic panel, the method comprising:

forming an intermediate resistive membrane and tubular guides in a same step of injecting a resin around a substrate placed between two halves of an injection mold, such that a first half of the injection mold comprises a plurality of protuberances, each protuberances having a surface shaped complementarily to a shape of an inner surface of the tubular guides, and a second half of the injection mold comprising a plurality of cavities, each cavity having a surface shaped complementarily to a shape of an outer surface of said tubular guides, said substrate comprising perforations which have a diameter equal to, or greater than, a diameter of a bottom of the tubular guides; and, inserting each of said protuberances into one of said perforations of said substrate before or during a closure of the injection mold before the injection of the resin into the injection mold, such that said substrate is impregnated with and embedded in a resin during the injecting of the resin.

2. The method according to claim 1, wherein the injection mold comprises a plurality of injection channels configured for manufacturing each of said tubular guides.

3. The method according to claim 1, wherein said substrate is pre-perforated.

4. The method according to claim 1, further comprising:

cropping the tubular guides to form openings at tops of the tubular guides, at the position where each of the plurality of injection channels open.

5. The method according to claim 1, wherein the substrate comprises a thermoplastic composite being a dry fiber.

6. The method according to claim 5, wherein said substrate comprises short fibers, long fibers, or continuous fibers.

7. The method according to claim 1, wherein said perforations of said substrate are formed by a stamping operation.

8. The method according to claim 7, wherein said stamping operation is performed in a heated stamping press.

* * * * *